June 1, 1965 G. W. MILLER ETAL 3,186,720
SEAL PLATE ARRANGEMENT
Filed Feb. 23, 1962
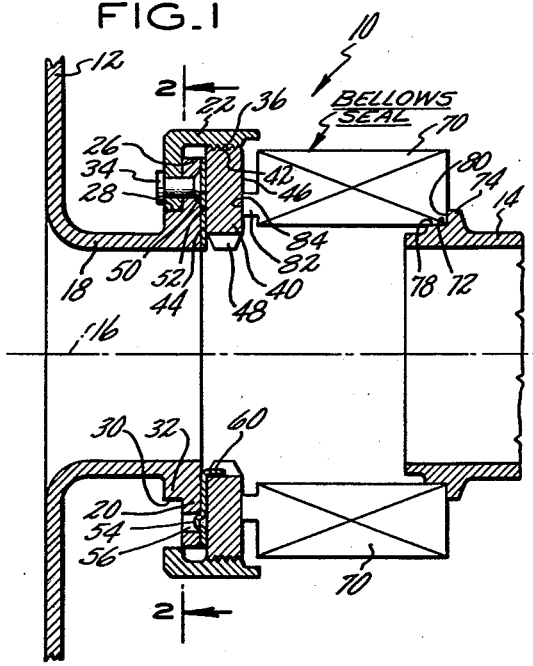
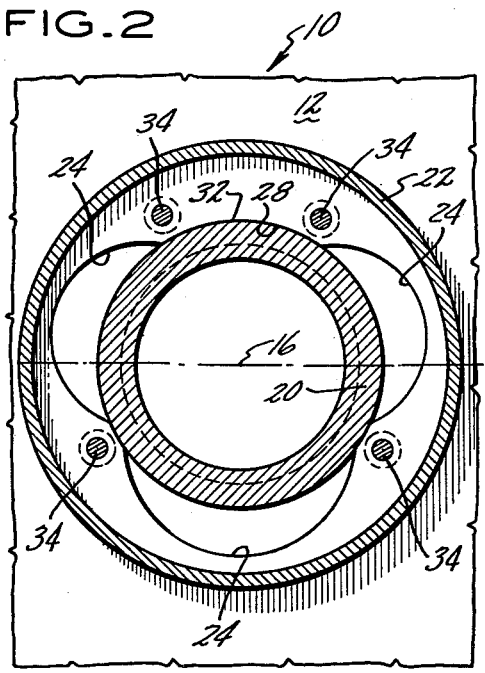
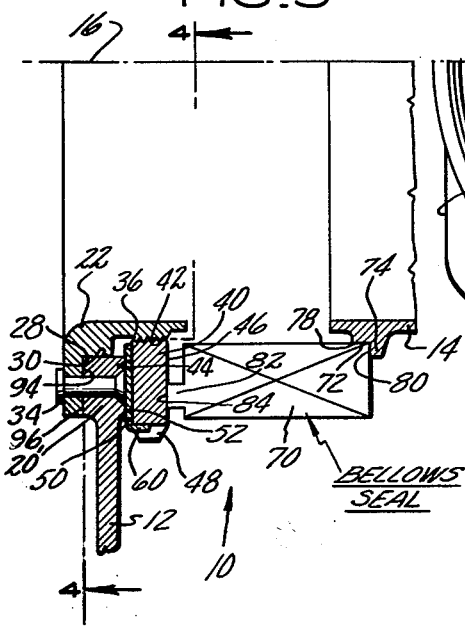
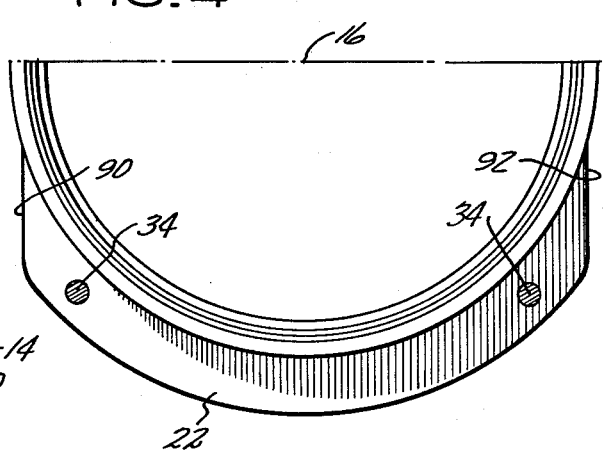
INVENTORS
GUY W. MILLER
ALEXANDER BENYI, JR.
BY Vernon F. Hauschild
ATTORNEY

United States Patent Office 3,186,720
Patented June 1, 1965

3,186,720
SEAL PLATE ARRANGEMENT
Guy W. Miller, Vernon, and Alexander Benyi, Jr., Granby, Conn., assignors to United Aircraft Corporation, East Hartford, Conn., a corporation of Delaware
Filed Feb. 23, 1962, Ser. No. 175,044
3 Claims. (Cl. 277—9)

This invention relates to sealable connections between relatively movable members and more particularly to such connections wherein assembly and disassembly of the parts can be accomplished easily.

It is an object of this invention to provide a seal connection between two relatively movable parts, which connection can be readily disassembled for the repair and replacement of the parts thereof.

It is a further object of this invention to teach such a seal connecion which is adapted for connection to either a bossed or unbossed container, which includes an easily removable seal plate and which further includes a bellows supported seal ring.

Other objects and advantages will be apparent from the specification and claims, and from the accompanying drawings which illustrate an embodiment of the invention.

FIGURE 1 is a cross-sectional showing of a preferred embodiment of my seal connection apparatus.

FIGURE 2 is a view taken along line 2—2 of FIGURE 1.

FIGURE 3 is a partial cross-sectional showing of a modification of my sealed connection.

FIGURE 4 is a view taken along line 4—4 of FIGURE 3.

Referring to FIGURE 1 we see my seal connection unit 10 sealably connecting container members 12 and 14. Members 12 and 14 are substantially coaxial about axis 16 and are relatively movable both axially, radially and circumferentially with respect to one another. Container member 12 is of the bossed variety with boss 18 projecting therefrom and including an external ring flange 20 projecting therefrom. Seal unit 10 is of generally circular cross section and concentric about axis 16. Nut member 22 has detents 24 machined in its inner diameter to permit the ring nut 22 to be tilted with respect to axis 16 and then fitted over the outer periphery 26 of external circumferential flange 20 of case 12. Once so positioned such that the inner diameter 28 of nut ring 22 engages the outer diameter 30 of flange step 32, rivets such as 34, are used to connect nut 22 to flange 20. Nut 22 also includes circumferential screw threads 36 which are concentric with respect to axis 16 with the nut 22 so riveted to flange 20. Seal plate 40 has threads 42 which cooperatively engage threads 36 of nut 22 such that seal plate 40 may be screwed into position within stationary nut 22. Seal plate 40 also includes opposite, radially extending sealing surfaces 44, 46 and further includes a plurality of circumferentially spaced and positioned detents 48 on its anti-thread side to permit engagement of a spanner or other type wrench for turning and threading seal plate 40 into position. A resilient lock ring 50 is positioned between the radial sealing surface 52 of flange 20 and radial sealing surface 44 of seal plate 40. Lock ring 50 is preferably silver-plated so as to engage surfaces 52 and 44 in sealing engagement. Lock ring 50 has axially extending tabs or dimples 54 extending therefrom which engage axially extending recess 56 in flange 20 so as to prevent relative circumferential movement between lock ring 50 and flange 20 and also includes bendable tabs 60 which may be bent from a radially extending to an axially extending position to engage detents 48 in seal plate 40 to prevent relative rotation and hence unthreading of the seal plate 40 with respect to lock ring 50 and hence flange 20 of container 12.

Flexible convolute bellows 70, which may include springs to add to the resiliency of the convoluted wall metal, but which is normally fully compressible, expandable and flexible without the aid of springs, extends from circumferential detent 72 of flange 74 of container member 14, which flange detent 72 provides both an axial surface 78 and a radial surface 80 for corresponding surfaces of bellows assembly 70 to bear against. At the opposite end of bellows assembly 70 from container 14 is carbon type seal ring 82 which is supported from bellows assembly 70 and includes radially extending sealing surface 84 which sealably engages surface 46 of seal plate 40.

It will therefore be seen that with container members 12 and 14 positioned as shown in FIGURE 1 and with nut 22, lock ring 50, seal plate 40 and bellows seal 70 assembled as in FIG. 1, unit forms a sealed connection between container members 12 and 14.

It is an important advantage of our invention that seal plate 40 and other parts of unit 10 be easily removed, repaired and replaced. This can be done by causing bellows seal 70 to be compressed toward container member 14 and free of seal plate 40 and thereby permit the release of seal plate 40 from tab 60 and the application of a spanner wrench to the detents 48 of seal plate 40 to permit the unthreading thereof from nut 22 to thereby accomplish its removal. Lock ring 50 is readily removable once seal plate 40 is removed. By the removal of rivets 34, nut 22 is also readily removable. These parts may be reassembled in the reverse order, namely, the nut 22, then the lock ring 50, then the seal plate 40 and eventually the release of bellows seal 70 to permit sealing surface 84 to contact sealing surface 46.

While my FIGS. 1 and 2 constructions shows an embodiment of my seal connection connected to a bossed container 12 having an outer diameter circumferential flange 20, FIGS. 3 and 4 illustrate an embodiment of my invention adapted for connection to a container 12 having an inner diameter flange 20'. In the FIGS. 3–4 construction, nut 22 has flat side surfaces 90 and 92 to permit the entry of nut 22 into container 12 such that radial surface 94 of the nut may engage radial surface 96 of flange 20'. The rivets 34 and lock ring 50 perform as in the FIGS. 1–2 construction as does seal plate 40, except that the thread 42 and spanner nut detents 48 are on opposite surfaces thereof from the FIGS. 1–2 construction since thread 36 of nut 22 is an outer diameter thread in the FIGS. 3–4 construction where it is an inner diameter thread in the FIGS. 1–2 construction.

It is to be understood that the invention is not limited to the specific embodiment herein illustrated and described but may be used in other ways without departure from its spirit as defined by the following claims.

We claim:
1. A seal unit with a readily removable and replaceable seal plate comprising:
   a first flanged device having a radially extending flange surface and a second device to be sealably connected,
   a connecting member connected and locked to said first device and including exposed screw threads,
     a seal plate having first and second smooth, radially extending, opposed sealing surfaces thereon and further having screw threads cooperatively engaging said connecting member screw threads,
   a resilient lock ring positioned between and sealably contacting said first seal plate surface and said first device flange surface and including protrusions to engage said seal plate and said first device to prevent relative motion therebetween when resiliently compressed therebetween due to said screw thread cooperation, a contact seal positioned against said seal plate second surface in sealing relation therewith, and compressible means bearing against said contact seal and said second device to cause said contact seal to bear against said seal plate second surface and such that said compressible means can be compressed to permit the retraction of said contact seal from said seal plate and to permit the threadable disconnection of said seal plate from said connecting member and the removal and replacement thereof.

2. A seal unit adapted to seal between a first and a second device to be sealably connected comprising:

a connecting member connected to the first of said devices and including exposed screw threads, means to lock said connecting member to said first device, a seal plate having two smooth sealing surfaces and including screw threads cooperatively engaging the screw threads of said connecting member, resilient lock means adapted to be positioned between said first device and said seal plate and including protrusions adapted to prevent relative rotation therebetween, a contact sealing member in sealing engagement with one of said smooth surfaces of said seal plate, and compressible means adapted to bear against the second device to be sealably connected and the contact seal to urge said contact seal against said seal plate and, when compressed, to permit the retraction of said contact seal from said seal plate and the disconnection of said screw threads to permit the removal and replacement of said seal plate.

3. A seal unit adapted to seal between a first flanged device having a radially extending flange surface and a second device coaxial therewith to be sealably connected and locked comprising:

a connecting ring member adapted to be connected and locked to the first of said devices and including exposed screw threads concentric about said axis, a seal plate ring concentric about said axis and having two smooth opposed, radially extending sealing surfaces and including screw threads cooperatively engaging the screw threads of said connecting member, resilient lock ring adapted to be positioned axially between the first device flange surface and said seal plate and having radial surfaces in sealing engagement with said first device and one of said seal plate radially extending sealing surfaces and including axially extending protrusions engaging each to prevent relative rotation therebetween, a contact sealing member in sealing engagement with one of said smooth radially extending surfaces of said seal plate, and compressible means adapted to bear against the second device to be sealably connected and the contact seal to urge said contact seal against said seal plate and, when compressed, to permit the retraction of said contact seal from said seal plate and the disconnection of said screw threads to permit the removal and replacement and reversal of said seal plate.

References Cited by the Examiner
UNITED STATES PATENTS
2,440,155  4/48  Peterson et al. _____ 277—88
FOREIGN PATENTS
1,023,246  12/52  France.
242,230  5/26  Great Britain.

LEWIS J. LENNY, Primary Examiner.
EDWARD V. BENHAM, Examiner.